United States Patent [19]

Yoshida

[11] Patent Number: 4,849,816
[45] Date of Patent: Jul. 18, 1989

[54] DATA COMMUNICATION APPARATUS FOR TRANSMISSION WITH VARIABLE FORMAT

[75] Inventor: Takehiro Yoshida, Tokyo, Japan

[73] Assignee: Canon Kabushiki Kaisha, Tokyo, Japan

[21] Appl. No.: 933,906

[22] Filed: Nov. 24, 1986

[30] Foreign Application Priority Data

Nov. 29, 1985 [JP] Japan .................. 60-267192

[51] Int. Cl.4 ............................................. H04N 1/32
[52] U.S. Cl. ..................................... 358/434; 358/443
[58] Field of Search ........................ 358/256, 257, 280

[56] References Cited

U.S. PATENT DOCUMENTS

| 4,249,216 | 2/1981 | Kamda | 358/257 |
| 4,419,697 | 12/1983 | Wada | 358/257 |
| 4,432,020 | 2/1984 | Omose et al. | 358/257 |
| 4,494,149 | 1/1988 | Furukawa | 358/257 |
| 4,581,656 | 4/1986 | Wada | 358/257 |
| 4,613,907 | 9/1986 | Yoshimoto et al. | 358/257 |
| 4,717,967 | 1/1988 | Yoshida | 358/296 |
| 4,772,955 | 9/1988 | Kurahayashi et al. | 358/257 |

Primary Examiner—Edward L. Coles, Sr.
Attorney, Agent, or Firm—Fitzpatrick, Cella, Harper & Scinto

[57] ABSTRACT

A data communication apparatus includes: a message information generating unit for generating message information; an index information generating unit for generating communication index information; a combining unit for combining the message information and the index information; a transmitting unit for transmitting the combined information combined by the combining unit; and a changing unit for changing the format and/or quantity of the index information depending on the page number of the combined information.

12 Claims, 3 Drawing Sheets on the second and succeeding pages with a simplified format.

The above and other objects, features and advantages of the present invention will become apparent from the following detailed description and the accompanying drawings.

DETAILED DESCRIPTION OF THE PREFERRED EMBODIMENT

The present invention will now be described in detail in connection with the preferred embodiment, specifically shown in the accompanying drawings.

Figure 1:
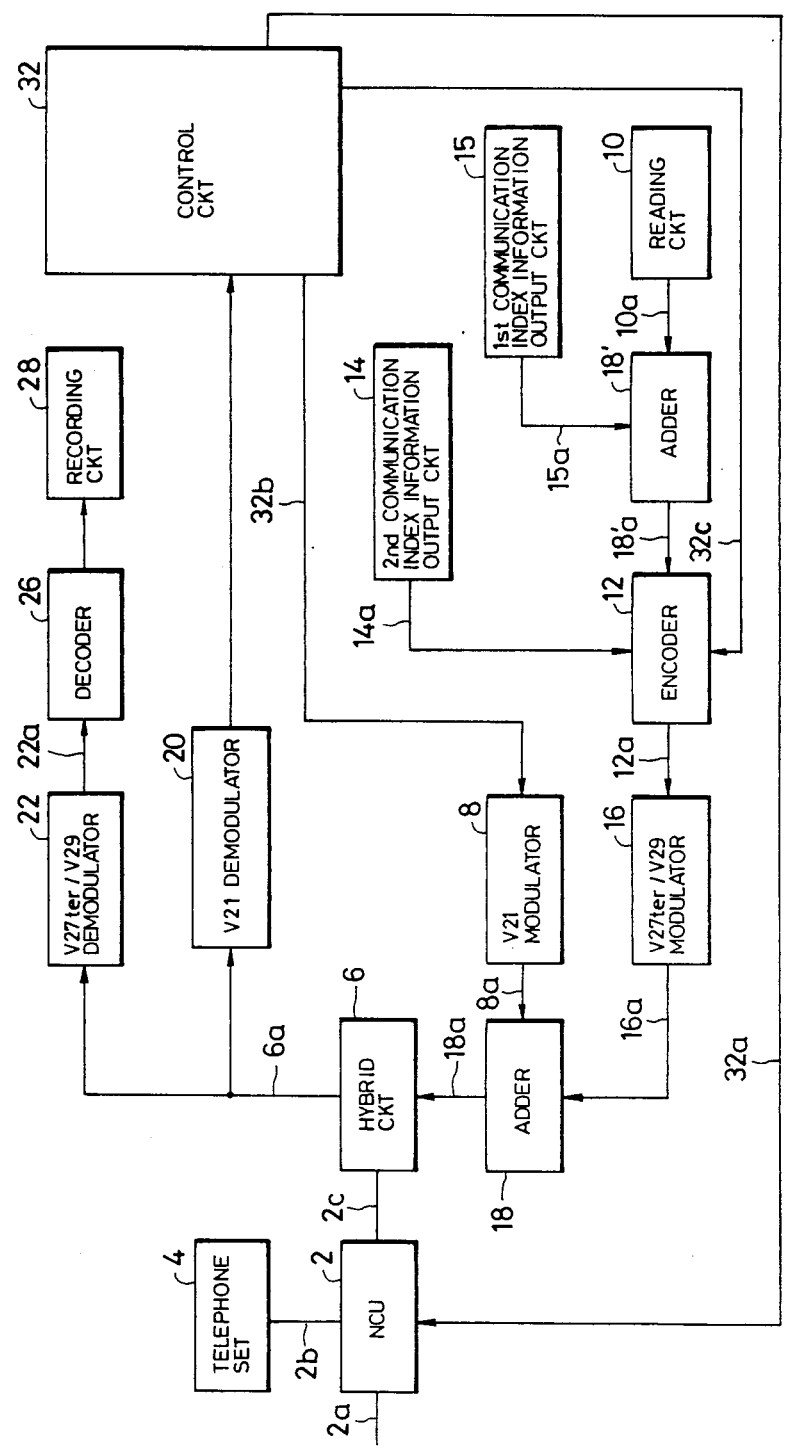
FIG. 1 is a block diagram showing an embodiment of a facsimile apparatus to which the present invention is applied.

FIG. 1 is a block diagram showing an embodiment of a facsimile apparatus to which the present invention is applied. In the figure, an NCU 2 (Network Control Unit) connected to a telephone network terminal is provided for using the network for data communication, and performs a connection control for the network, switches to a data communication line, and holds a loop. A telephone network line 2a is connected to NCU 2 to which a telephone set 4 is connected via a signal line 2b.

NCU 2 is controlled via a signal line 32a by a control circuit 32 constructed of a microcomputer and the like. Specifically, NCU controls to connect the telephone network line 2a to the telephone set 4 when the signal line 32a is at level "1", and to connect the network line 2a to a hybrid circuit 6 via a signal line 2c when at level "0".

The hybrid circuit 6 separates transmission signals and reception signals, such that signals on the signal line 2c are output to a signal line 6a and signals on a signal line 18a to the signal line 2c, respectively. Thus, at the succeeding stages of the signal line 6a a receiving system is connected, while at the preceding stages of the signal line 18a a sending system is connected.

First, the sending system will be described.

Transmission signals are divided into procedure signals and image signals.

Each procedure signal conforming with the CCITT Recommendation is produced by the control circuit 32, sent via a signal line 32b to a modulator 8 constructed as defined by CCITT Recommendation V21 where it is modulated, input to an adder 18 via a signal line 8a, and delivered to the hybrid circuit 6 via the signal line 18a.

Original image information is read by a reading circuit 10 employing such as a CCD line sensor or the like, and input to an adder 18' via a signal line 10a. The adder 18' is provided for producing one-page image information, whereat first communication index information of a simplified format, such as the name of the sending party of the facsimile, telephone number, page number and the like, is affixed to a predetermined area on each page of the original image information, e.g., the header area on each page. The simplified communication index information is output from a first communication index information output circuit 15 constructed of a memory and a character generator outputting dot matrix characters and the like.

DATA COMMUNICATION APPARATUS FOR TRANSMISSION WITH VARIABLE FORMAT

BACKGROUND OF THE INVENTION

1. Field of the Invention

The present invention relates to a data communication apparatus for sending and receiving message information, and index information associated with its communication.

2. Related Background Art

According to a conventional technique known in the art of facsimile, index information such as the name of a sending party, telephone number, communication data, page number and the like is sent in the form of image information constructed of dot matrices, and recorded at the receiving party on the header of recording papers one page after another.

Such index information associated with communication must be recorded on the area outside the nominal recording area of the recording paper, without destroying the subject original (message) information. In view of this, a recording area of about one line or so (using dot matrix characters) is usually assigned to control information associated with its communication (hereinafter called "communication index information"). Therefore, the amount of communication index information to be recorded is limited to such extent. If a large amount of index information is desired to be recorded, the communication index information must be simplified, for example, using an abbreviation or the like, or the message area on the recording paper must be extended.

Conventionally, the communication index information has been recorded on each page of the recording papers at the same area thereof and in the same format. Assuming such a way of recording is performed and a recording area for the communication index information is extended, then the recording paper may be consumed wastefully or the original image information may be destroyed. Specifically, in a case of a facsimile apparatus using recording paper previously cut sheets of into a predetermined size (A4, B5 and so on), there is a possibility of consuming an additional recording paper for recording the communication index information alone.

Contrary to the above, if simplified communication index information is densely recorded within one line without broadening the recording area therefor, there arises a problem that the recorded information is hard to read and understand.

SUMMARY OF THE INVENTION

It is an object of the present invention to provide a data communication apparatus eliminating the above-described disadvantages.

According to one aspect of the present invention is provided a data communication apparatus wherein the amount of communication index information or the format thereof is changed depending on the page number of the recording paper, and whereby the recording paper is not consumed wastefully and the communication index information can be readily recognized.

Figure 3A:
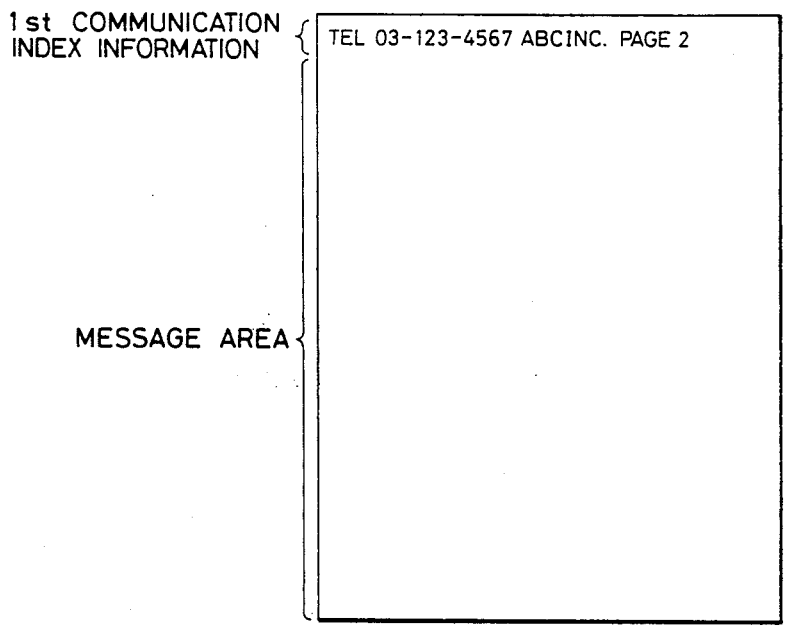
FIGS. 3A and 3B show examples of recorded information at a receiving side.

According to another aspect of the present invention, it is to provide a data communication apparatus wherein the communication index information is recorded on the first page of recording paper with a detailed format, One-page image information generated at the adder 18' must be of a quantity meeting the paper length/width ratio requirement in order that the information can be recorded at the receiving side on a recording paper of predetermined nominal ISO size without excess and deficiency in recording. An example of information recorded at a receiving side is shown in FIG. 3A.

The output signal of the adder 18' is input via a signal line 18'a to an encoder 12 whereat it is converted, e.g., into a modified Hoffmann code or the like. The encoder 12 selects either of the output of the adder 18'0 or the output of a second communication index information output circuit 14, depending on the signal state on an output signal line 32c of the control circuit 32, and encodes the output.

Figure 3B:
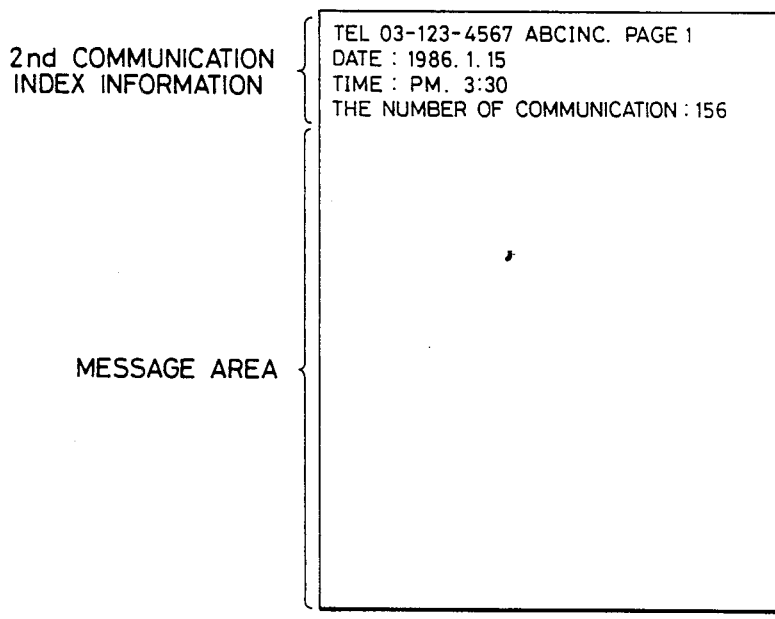

The second communication index information output circuit 14 is constructed similarly to the output circuit 15, but the second communication index information output therefrom has a more detailed format than that of the first communication index information output from the first output circuit 15. For instance, the second communication index information may include the communication data, accumulated number of communications and the like, other than the name of the sending party, telephone number and page number, and is arranged in a predetermined format. Such detailed second communication index information is output onto a signal line 14a. An example of such second communication index information recorded at a receiving side is shown in FIG. 3B.

The encoder 12 selects the output of the adder 18' when the signal line 32b is at level "0" and the output of the second communication index information output circuit 14 when at level "1", and encodes the output. The encoded output is input to a modulator 16 via a signal line 12a.

The modulator 16 performs a differential phase modulation or orthogonal demodulation respectively defined by CCITT Recommendation V27 or V29.

The resultant signal modulated by the modulator 16 is input via a signal line 16a to the adder 18 so that an image signal and a procedure signal are added together and delivered to the hybrid circuit 6.

The receiving system is constructed as described below.

A procedure signal outputted from the hybrid circuit 6 is demodulated by a demodulator 20 having a performance corresponding to that of the modulator 8, and the procedure signal recovered as digital (binary value) data is input to the control circuit 32.

The image signal is demodulated by a demodulator 22 having a performance corresponding to that of the modulator 16, and input via a signal line 22a to a memory or a decoder 26. The decoder 26 performs signal processing corresponding to the encoding by the encoder 12.

The decoded image information is recorded by a recording circuit 28 constructed of a thermal printer for example.

Figure 2:
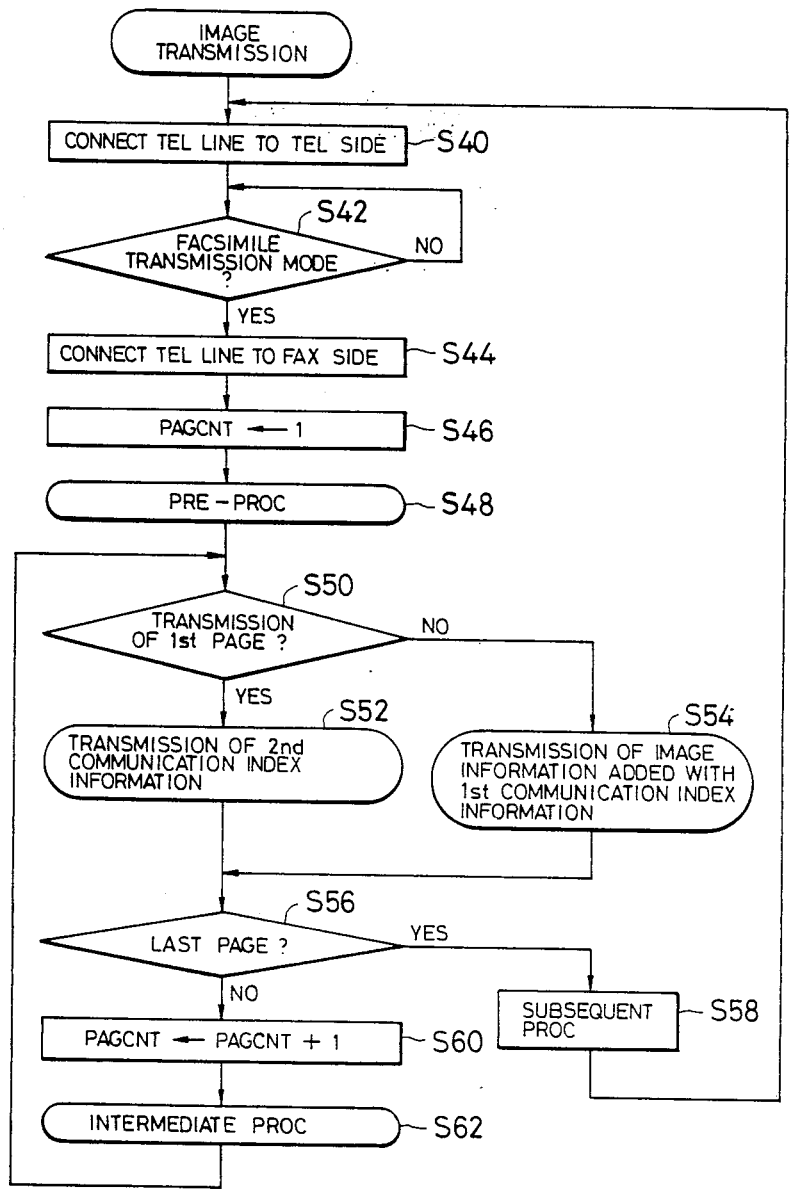
FIG. 2 is a flow chart illustrating the control procedure of the control circuit of FIG. 1.

The control circuit 32 has memory means such as a ROM and controls the entirety of the facsimile in accordance with the control program stored in the ROM. FIG. 2 is a flow chart illustrating the transmission control procedure of the control circuit 32, according to the above embodiment of the present invention.

During a wait condition before an image transmission, the control circuit 32 first sets the signal line 32a level at "0" at step S40 and controls NCU 2 to connect the telephone set 4 to the network line 2a. At step S42, the control circuit 32 waits for a selection of an image transmission mode. Upon selection of the transmission mode, for example after an original is placed on an original reading position and a predetermined switch is actuated, then step S44 follows to set the signal line 32a level at "1" and controls NCU 2 to connect the telephone network line 2a to the hybrid circuit 6 for preparation for a facsimile transmission.

Next, at step S46, the content of a counter PAGCNT for counting the transmission page number is initialized to "1". This counter is constructed of a predetermined area of the memory in the control circuit 32, and registers.

At the following step S48, known communication preprocedures, such as calling a receiving party, and setting a communication mode by the procedure signal, are carried out. For modulation and demodulation of the procedure signal, the modulator 8 and the demodulator 20 are used, respectively.

At step S50, it is judged if the content of the counter PAGCNT is "1" or not to thus confirm if the transmission is for the first page or not.

In the case of first page transmission, at step S52 the detailed second communication index information of the transmission party output from the second communication index information output circuit 14 is encoded and modulated, independently of the original image information, and delivered onto the telephone network line 2a. At this time, the control circuit 32 makes the signal line 32b level at "1" so that the encoder 12 selects the output of the second communication index output circuit 14.

At the second and succeeding pages the counter PAGCNT has been counted up as will be described later. Therefore, at step S54, a signal of level "0" is output onto the signal line 32b, so that an image signal obtained by adding the original image information output from the reading circuit 10 to the simplified first communication index information of the transmission party output from the first communication index information output circuit 15, is encoded, demodulated and output.

After one-page transmission, it is judged if the transmission was for the last page or not, at step S56. This is judged by checking the output of an original sensor provided at the reading circuit 10. If it is not the last page, at step S60 the content of the counter PAGCNT is incremented by "1". After performing intermediate procedures at step S62, step S50 resumes to repeat the above operations.

After completion of the last page transmission, at step S58 subsequent procedures are carried out to disconnect the network line, and thereafter, the wait loop at steps S40 to S42 resumes.

As seen from the above embodiment, the detailed communication index information is transmitted and recorded on the first page independently of the image information, and the image information added with the simplified communication index information is sequentially transmitted and recorded on the second and succeeding pages. Therefore, the operator at the receiving side can correctly recognize the sending party, communication data and time, telephone number and the like on the first page, thus enabling one to make good use of it for filing the received recording papers. Further, since only the simplified communication index information is recorded on the second and succeeding pages, there is no fear of destroying the image information nor of resulting in a larger recording paper size in a case of using a roll-sheet recording paper. Furthermore, in a case of using cut-sheet recording paper, an additional recording paper is not needed for recording the communication index information for each page of the original.

Various formats of the communication index information recorded on the second and succeeding pages at the receiving party may be available. The detailed index information on the first page may be recorded as a table form using the entire area of the first page, or may be recorded on several lines of the first page leaving the remaining lines for the image information. Only the page number may be recorded on the second and succeeding pages as the communication index information. As above, the quantity and format of the communication index information to be recorded at the receiving party may be optional and various modifications can be made by those skilled in the art.

In a case of using a cut-sheet recording paper at the receiving side (the type of recording paper can be communicated by the communication pre-procedure), transmission of the detailed communication index information on the first page is previously indicated so that the receiving party may use a short cut-sheet recording paper for recording it. Further, in the case of the apparatus of the type in which roll-sheet recording paper is cut with a cutter after recording, the first page may be cut shorter.

In the above embodiment, a facsimile apparatus for transmitting image information has been described. However, it is obvious that the invention is also applicable to other data communication apparatus such as teletex for transmitting character codes.

As apparent from the foregoing description, according to one aspect of the present invention, in a data communication apparatus which transmits the image information as well as the communication index information, control means for regulating the quantity and format of the communication index information depending on the page number, is provided. Therefore, the operator at the receiving side can properly utilize the communication index information. Moreover, a data communication apparatus can be realized which does not consume the recording paper wastefully and has a good efficiency.

The present invention is not intended to be limited to the above-described embodiment, but various applications and alterations are possible within the scope of the appended claims.

What is claimed is:

1. A data communication apparatus comprising:
   message information generating means for generating message information;
   index information generating means for generating communication index information;
   combining means for combining the message information and the index information;
   transmitting means for transmitting the combined information combined by said combining means; and
   changing means for changing a format of the index information depending on a number of a page of the combined information.

2. A data communication apparatus according claim 1, wherein said changing means changes the index information on a first page in a first format, and changes the index information of the combined information on a second and succeeding pages in a second format simpler than said first format.

3. A data communication apparatus according to claim 1, wherein the message information includes original image information.

4. A data communication apparatus according claim 2, wherein the index information of said second format includes at least a page number.

5. A data communication apparatus according to claim 2, wherein the index information of said first format includes identification information of a sending party and transmission time information.

6. A data communication apparatus comprising:
   message information generating means for generating age information;
   index information generating means for generating communication index information;
   combining means for combining the message information the index information;
   transmitting means for transmitting the combined information combined by said combining means; and
   changing means for changing a quantity of the index information depending on a page number of the combined information.

7. A data communication apparatus according to claim 6, wherein said changing means makes the quantity of the index information of the combined information at a first page larger than those at a second and succeeding pages.

8. A data communication apparatus according to claim 6, wherein the message information includes original image information.

9. A data communication apparatus according to claim 7, wherein the index information at the first page includes identification information of a sending party and transmission time information.

10. A data communication apparatus according to claim 7, wherein the index information at the second and succeeding pages includes at least a page number.

11. A data communication apparatus comprising:
    message information generating means for generating a plurality of pages of message information;
    index information generating means for generating communication index information;
    combining means for combining the message information and the index information;
    transmitting means for transmitting the combined information combined by said combining means; and
    changing means for changing a format of the index information,
    wherein said changing means changes the format of the index information in the middle of the message information.

12. A data communication apparatus according to claim 11, wherein said changing means changes the format of the index information depending on the page number of the combined information.

* * * * *

UNITED STATES PATENT AND TRADEMARK OFFICE
CERTIFICATE OF CORRECTION

PATENT NO. : 4,849,816
DATED : July 18, 1989
INVENTOR(S) : TAKEHIRO YOSHIDA       Page 1 of 2

It is certified that error appears in the above-identified patent and that said Letters Patent is hereby corrected as shown below:

Title page:

AT [56] REFERENCES CITED

U.S. Patent Documents, "Kamda" should read --Kanda--; "Omose et al." should read --Onose et al.--; and "4,494,149 1/1988 Furukawa" should read --4,494,149 1/1985 Furukawa--.

COLUMN 1

Line 43, "sheets of into" should read --into sheets of--.

COLUMN 3

Line 12, "adder 18'0" should read --adder 18'--.

UNITED STATES PATENT AND TRADEMARK OFFICE
CERTIFICATE OF CORRECTION

PATENT NO. : 4,849,816
DATED : July 18, 1989
INVENTOR(S) : TAKEHIRO YOSHIDA

Page 2 of 2

It is certified that error appears in the above-identified patent and that said Letters Patent is hereby corrected as shown below:

COLUMN 6

```
Line 4,  "according" should read --according to--.
Line 13, "according" should read --according to--.
Line 22, "age information;" should read
         --message information;--.
Line 26, "mation the" should read --mation and the--.
```

Signed and Sealed this

Twenty-third Day of January, 1990

*Attest:*

JEFFREY M. SAMUELS

*Attesting Officer*     *Acting Commissioner of Patents and Trademarks*